Nov. 7, 1961 W. R. BROOKSBANK 3,007,826
STRAPS AND BELTING
Filed Aug. 6, 1957
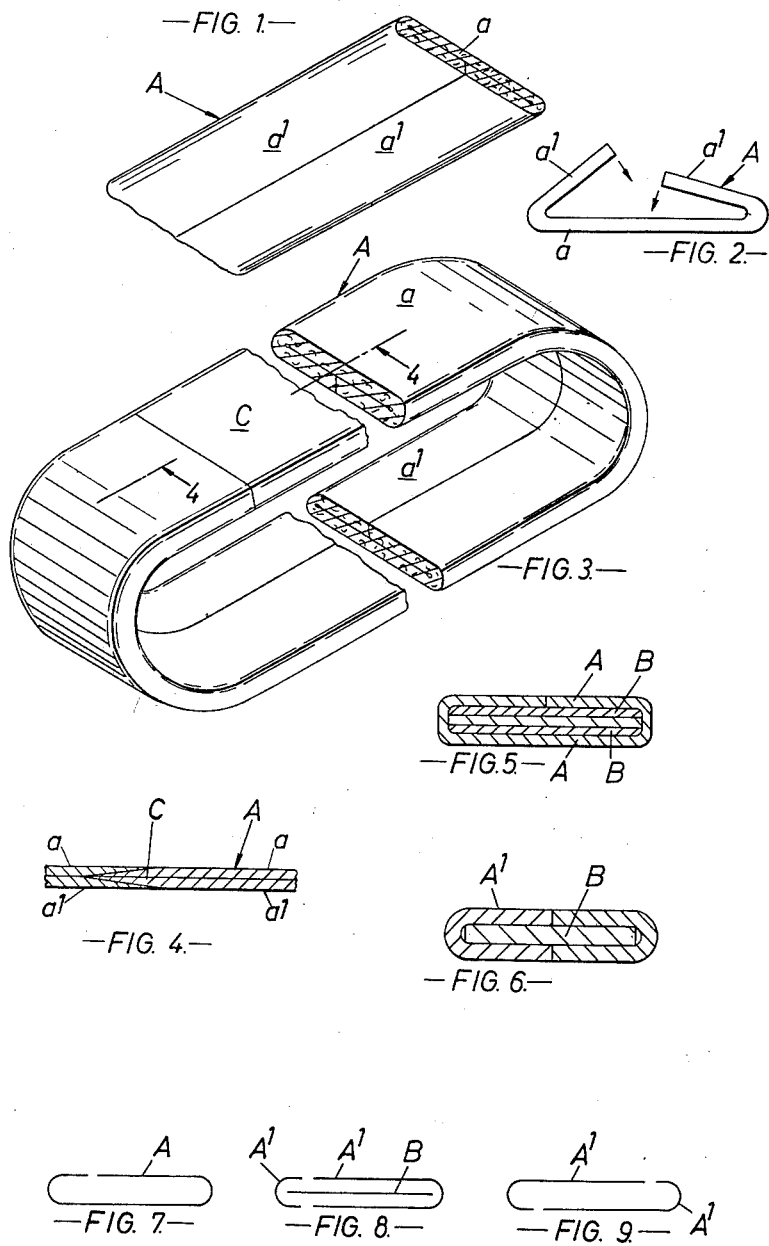
INVENTOR
WALLACE R. BROOKSBANK
BY
Norris + Bateman
ATTORNEY 3,007,826
STRAPS AND BELTING
Wallace Ronald Brooksbank, Ilkley, England
Filed Aug. 6, 1957, Ser. No. 676,607
Claims priority, application Great Britain Mar. 2, 1957
3 Claims. (Cl. 154—52.1)

This invention relates to improvements in belting.

Belts formed from a single ply of material such as leather, rubber, plastic or fabric are well known as are straps and belts constructed from laminated plies of similar or differing materials. Such belts suffer from the disadvantages that excessive wear or abrasion often takes place at the edges since said edges are comprised of the edges of the ply or plies of material. This is especially disadvantageous in laminated belts as edge wear may cause the plies to separate thereby reducing the useful life of the belt. Also in the case of laminated belts constructed from differing materials such as leather and plastic, the inside ply or plies may be formed for other reasons from a material not very resistant to abrasion, said ply or plies being protected from abrasive wear on their surfaces but not on their edges.

The object of the present invention is to form a belt from an outer ply or plies of leather, rubber, plastic fabric or other suitable material by folding in such manner that both edges of the belt are formed from a single fold of material (though not necessarily of the same piece) which forms a protection for both edges of the belt.

According to the invention a belt is formed by folding two plies of material on themselves to form the edges of the belt with the joint between the plies of material along the top and bottom surface of the belt or by folding a single ply of material on itself twice and to provide the joint between edges of the ply along the top or bottom surface of the belt to produce a continuous surface over the edges of the belt.

The invention will be described with reference to the accompanying drawings:

FIG. 1 is a perspective view partly in section of one form of belt,

FIG. 2 is an end elevation during manufacture of the belt,

FIG. 3 is a perspective view of a scarf joint for an endless belt,

FIG. 4 is an enlarged longitudinal section on line 4—4, FIG. 3,

FIG. 5 is a transverse section of a further form of the invention,

FIG. 6 is a transverse section of a still further form,

FIGS. 7–9 are diagrammatic sections of modified constructions.

A belt A may be formed from a single ply of material (FIG. 1) doubled on itself twice to produce an upper layer $a$ and lower layer $a^1$, the joint between the longitudinal edges of the belt lying along the upper or lower surface layers of the belt. The joint may lie centrally of the lower or upper surface or may be offset from the centre (FIG. 7). Alternatively, the belt may be formed from two plies of material each doubled on itself (FIG. 9), with the longitudinal joints between the two plies lying on the upper and lower surfaces of the belt.

The edges of outer ply or plies may form a longitudinal seam parallel to the edges of the strap or belt or may alternatively be arranged at any angle to the edges of the strap or belt. The edges of ply or plies may be unjoined (abutting or apart) or alternatively joined or linked together in any way.

In these constructions the longitudinal edges of the belt are formed by the folded over portion of the ply or plies and thus present continuous surfaces at the edges as distinct from a raw edge, such continuous surfaces being considerably more resistant to wear and abrasion than a raw edge.

In further forms of the invention, FIGS. 5, 6 and 8, the outer ply or plies are shown surrounding an inner reinforcing ply or plies B, the reinforcing ply or plies being substantially enclosed by the outer ply A or plies $A^1$.

The upper and lower layers of the belt and the intervening ply or plies (if any) may be secured together by stitching, adhesive or otherwise.

A scarf joint C for an endless strap or belt is formed as shown in FIGS. 3 and 4 with the ends of the ply chamfered and joined together so that the ends of the ply present on all the outer surfaces of the belt trailing edges with respect to the direction of travel of the belt which is a considerable advantage especially in the case of certain belts or aprons employed on textile processing machinery. The scarf joint C is sewn through or adhesively secured transversely of the belt.

I claim:

1. In an endless belt, a continuous strip of material having a non-folded central portion of uniform width and folded longitudinal edges disposed in abutting relationship along a continuous longitudinal joint intermediate the longitudinal sides of said continuous strip and underlying the unfolded portion in folded position whereby to form at least a double layer of stripping wherein the surfaces of said sides are continuous with the surfaces of said layers, and a transverse joint having the same cross-sectional size as the remainder of said belt formed by interleaved transverse end portions of said folded continuous strip comprising a longitudinally extending tapered recess formed by one of said end portions and a correspondingly longitudinally tapered wedge formed by the other of said end portions, said wedge being received in and filling said tapered recess and cemented to the face thereof whereby trailing end edges of the transverse joint are provided in the opposite longitudinal surfaces of said belt at said joint.

2. In the belt defined in claim 1, said recess comprising coextensive similarly diverging surfaces respectively formed on the overlying and underlying layers at one end portion of the strip, said wedge comprising coextensive converging corresponding surfaces respectively formed on the overlying and underlying layers at the other end portion of the strip and extending into and filling said recess, the outer faces of said layers merging smoothly into each other in their planes.

3. A method for producing an endless belt from a continuous strip of single ply material comprising the steps of providing the free ends of the continuous strip with transverse correspondingly interfitting chamfers, interleaving and securing the chamfered portions in overlapping interfitting surface abutment with each other to form a loop from said continuous strip of material, folding the longitudinally extending edges of the looped strip of material over to underlie the underfolded portion of said strip, securingly disposing the longitudinal edges of said strip in abutting relationship along a continuous longitudinal joint intermediate the longitudinally extending sides of said continuous strip in folded position whereby to form in interfitting relation a uniform section transverse joint endless belt.

References Cited in the file of this patent

UNITED STATES PATENTS

| | | |
|---|---|---|
| 1,020,496 | Hawe | Mar. 19, 1912 |
| 1,478,025 | Cobaugh | Dec. 18, 1923 |
| 1,679,575 | Kimball | Aug. 7, 1928 |
| 1,834,606 | Davis | Dec. 1, 1931 |
| 2,203,822 | Hyman | June 11, 1940 |
| 2,294,088 | Kholos | Aug. 25, 1942 |
| 2,332,495 | Bass | Oct. 26, 1943 |
| 2,400,594 | Nienaber | May 21, 1946 |
| 2,657,161 | Luitwieler | Oct. 27, 1953 |
| 2,941,914 | Ouimet | June 21, 1960 |

FOREIGN PATENTS

| | | |
|---|---|---|
| 546,219 | Great Britain | July 2, 1942 |